(12) United States Patent
Torre

(10) Patent No.: US 12,338,873 B2
(45) Date of Patent: Jun. 24, 2025

(54) SINGLE PIECE SHOCK BODY

(71) Applicant: Michael Torre, Long Beach, CA (US)

(72) Inventor: Michael Torre, Long Beach, CA (US)

(73) Assignee: Fundamental Motorsports, LLC, Long Beach, CA (US)

( * ) Notice: Subject to any disclaimer, the term of this patent is extended or adjusted under 35 U.S.C. 154(b) by 304 days.

(21) Appl. No.: 17/958,191

(22) Filed: Sep. 30, 2022

(65) Prior Publication Data

US 2024/0093748 A1 Mar. 21, 2024

Related U.S. Application Data

(60) Provisional application No. 63/395,705, filed on Aug. 5, 2022.

(51) Int. Cl.
| | |
|---|---|
| *F16F 9/06* | (2006.01) |
| *F16F 9/32* | (2006.01) |
| *F16F 9/34* | (2006.01) |
| *F16F 9/44* | (2006.01) |

(52) U.S. Cl.
CPC .............. *F16F 9/065* (2013.01); *F16F 9/061* (2013.01); *F16F 9/3235* (2013.01); *F16F 9/34* (2013.01); *F16F 9/44* (2013.01); *F16F 2222/12* (2013.01); *F16F 2226/04* (2013.01); *F16F 2228/066* (2013.01); *F16F 2230/36* (2013.01); *F16F 2232/08* (2013.01); *F16F 2234/02* (2013.01)

(58) Field of Classification Search
CPC .... F16F 9/061; F16F 9/065; F16F 9/34; F16F 9/3235; F16F 9/44; F16F 222/12; F16F 2226/04; F16F 2228/066; F16F 2230/36; F16F 2232/08

USPC .......... 188/313, 314, 315, 318, 320, 322.21, 188/322.13; 267/64.15, 64.23
See application file for complete search history.

(56) References Cited

U.S. PATENT DOCUMENTS

| | | | | |
|---|---|---|---|---|
| 2,048,037 A | * | 7/1936 | Smith | F16F 9/44 251/208 |
| 2,714,429 A | * | 8/1955 | Etherton | F16F 9/3405 267/226 |
| 4,153,237 A | * | 5/1979 | Supalla | B60G 17/04 188/266.8 |
| 4,159,756 A | * | 7/1979 | Murakami | F16F 9/44 188/282.5 |

(Continued)

OTHER PUBLICATIONS

PCT/US2023/029140 filed Jul. 31, 2023 International Search Report and Written Opinion dated Oct. 19, 2023.

*Primary Examiner* — Christopher P Schwartz
(74) *Attorney, Agent, or Firm* — Rutan & Tucker, LLP; Kyle M. St. James

(57) ABSTRACT

Disclosed herein are shock absorbers and shock body assemblies, that include a shock body that is formed of a single part. The shock body includes a cylinder cavity and reservoir cavity that share a single separating wall and are closed on top by a single integral cap portion. Multiple fluid flow paths extend along an exterior the cylinder cavity and have top and bottom ends fluidly coupled with cylinder cavity. The shock body assembly includes multiple check valves and adjustable valves, integrated into the flow paths, that govern hydraulic flow along the flow paths to affect the damping function of the shock absorber. The shock body is formed via a material additive manufacturing process such that the shock is formed of a single material via a single continuous process.

16 Claims, 5 Drawing Sheets

(56) References Cited

U.S. PATENT DOCUMENTS

| | | | | |
|---|---|---|---|---|
| 4,655,440 | A * | 4/1987 | Eckert | F16F 9/096 188/266.5 |
| 4,732,244 | A * | 3/1988 | Verkuylen | F16F 9/467 188/315 |
| 4,928,799 | A * | 5/1990 | Zschiesche | F16L 3/217 267/221 |
| 4,936,423 | A * | 6/1990 | Karnopp | B60G 17/08 188/266.5 |
| 5,016,911 | A * | 5/1991 | Takehara | B60G 15/12 267/64.15 |
| 5,392,885 | A * | 2/1995 | Patzenhauer | F16F 9/46 188/266.6 |
| 9,080,631 | B2 | 7/2015 | Hoult | |
| 9,863,494 | B2 * | 1/2018 | Yu | F16F 9/062 |
| 2010/0252972 | A1 | 10/2010 | Cox et al. | |
| 2016/0265614 | A1 | 9/2016 | Ripa | |
| 2019/0136932 | A1 | 5/2019 | Deferme | |
| 2019/0154100 | A1 | 5/2019 | Coaplen et al. | |
| 2022/0281278 | A1 * | 9/2022 | Boulay | B60G 13/005 |

* cited by examiner

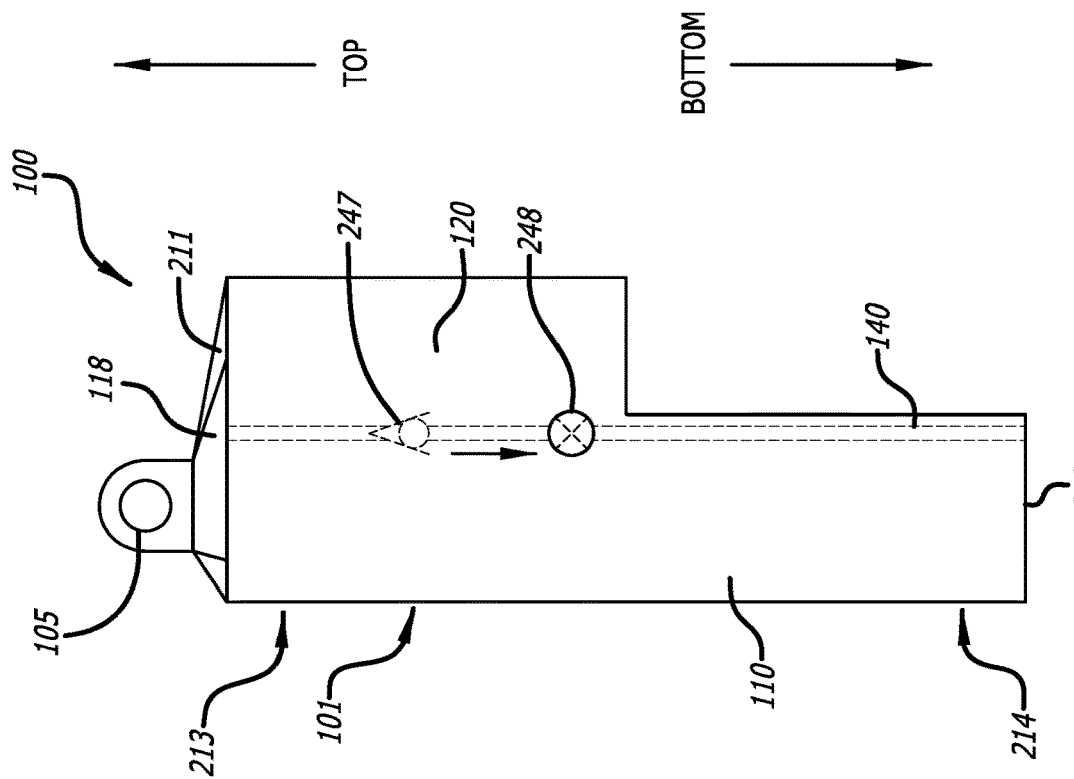
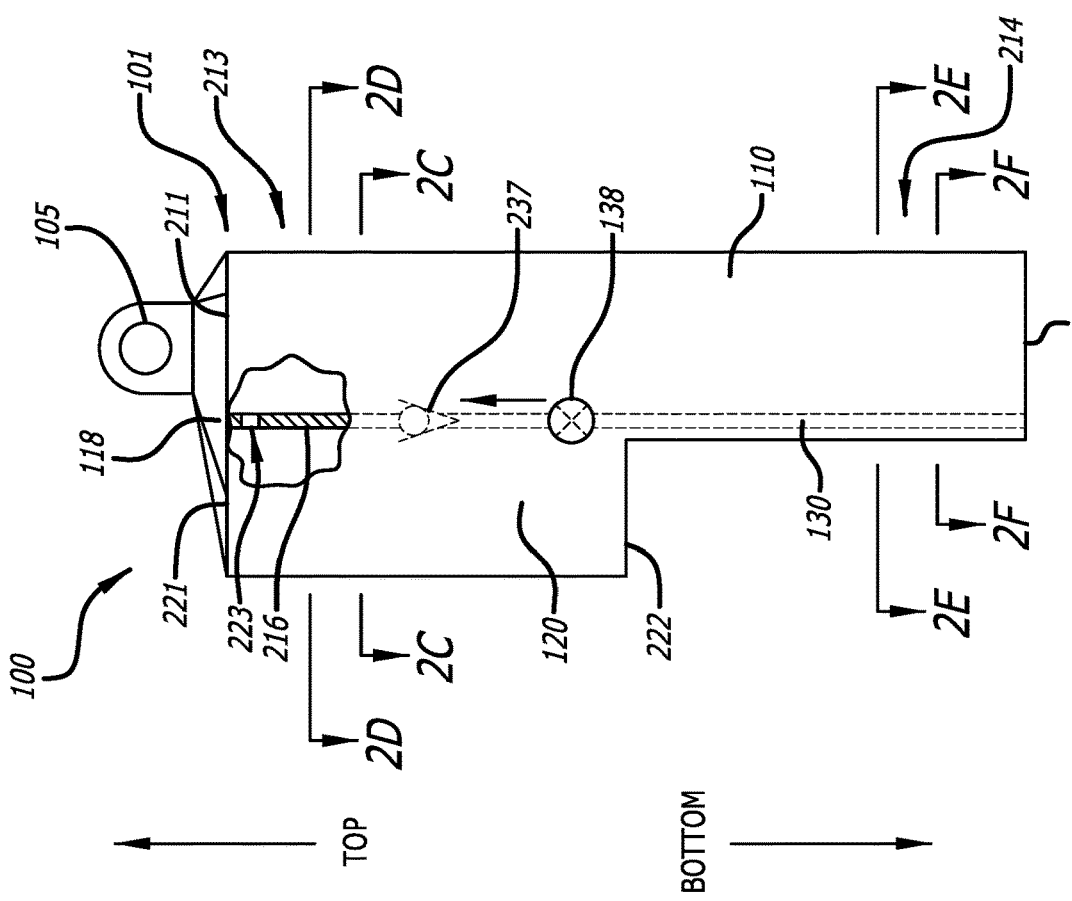

SINGLE PIECE SHOCK BODY

BACKGROUND

The cost of manufacturing mechanical equipment and devices is strongly proportional to the number of components that are assembled together. The manufacturing, acquiring, managing, handling, and storing of multiple components can in some instances contribute significantly to the cost. Over the last few years, the 3D printing processes having shown to greatly reduce the number of components of assemblies and therefore significantly reduce the manufacturing cost of those assemblies. Shock absorbers are one type of mechanical assembly that could benefit by 3D printing processes as disclosed herein.

SUMMARY

Disclosed herein is shock absorber body assembly that according to some embodiments, includes a cylinder cavity defining a top cylinder end and bottom cylinder end and a reservoir cavity defining a top reservoir end and bottom reservoir end, the reservoir cavity in fluid communication with the cylinder cavity. A body cap closes off the cylinder cavity and reservoir cavity. A first fluid pathway extends along an exterior of the cylinder cavity defining a first end of the first fluid pathway in fluid communication with a top portion of the cylinder cavity and second end of the first fluid pathway in fluid communication with a bottom portion of the cylinder cavity. Similarly, a second fluid pathway extends along an exterior of the cylinder cavity defining first end of the second fluid pathway in fluid communication with a top portion of the cylinder cavity and second end of the second fluid pathway in fluid communication with a bottom portion of the cylinder cavity. The shock body includes (i.e., is formed of or defines) only a single component.

In some embodiments, the shock body is formed via a material additive manufacturing process, and in some embodiments, the shock body is formed of a single material.

In some embodiments, the cylinder cavity and the reservoir cavity share a common separation wall, and in some embodiments, the cylinder cavity is fluidly coupled with the reservoir cavity via a transfer port extending across the common separation wall. Further in some embodiments, the transfer port is located adjacent the top cylinder end and the top reservoir end.

In some embodiments, the cylinder cavity is configured to receive a cylinder cap at the bottom cylinder end, and the reservoir cavity is configured to receive a reservoir cap at the bottom reservoir end.

In some embodiments, the first fluid pathway is separated from the cylinder cavity by a single separation wall between the first fluid pathway and cylinder cavity. In such embodiments, the first fluid pathway is fluidly coupled with the top portion of the cylinder cavity via a top port of the first fluid pathway extending across the single separation wall between first fluid pathway and cylinder cavity, and the first fluid pathway is fluidly coupled with the bottom portion of the cylinder cavity via a bottom port of the first fluid pathway extending across the single separation wall. Similarly, the second fluid pathway is separated from the cylinder cavity by a single separation wall between the second fluid pathway and the cylinder cavity. The second fluid pathway is fluidly coupled with the top portion of the cylinder cavity via a top port of the second fluid pathway extending across the single separation wall, and the second fluid pathway is fluidly coupled with the bottom portion of the cylinder cavity via a bottom port of the second fluid pathway extending across the single separation wall.

In some embodiments, the shock absorber body assembly further includes a first check valve disposed in line with the first fluid pathway, where the first check valve is configured to allow hydraulic fluid flow along the first fluid pathway in a first direction between the top and bottom portions of the cylinder cavity and prevent hydraulic fluid flow in a second direction flow along the first fluid pathway between the top and bottom portions of the cylinder cavity, where the second direction is opposite the first direction.

In some embodiments, the shock absorber body assembly further includes a first adjustable valve disposed in line with the second fluid pathway, where the first adjustable valve is configured to selective limit hydraulic fluid flow along the second fluid pathway between the top and bottom portions of the cylinder cavity. In some embodiments, the first adjustable valve is disposed between the top and bottom ends of the reservoir cavity.

In some embodiments, the shock absorber body assembly further includes a second check valve disposed in line with the second fluid pathway, the second check valve configured to prevent hydraulic fluid flow along the second fluid pathway in the first direction between the top and bottom portions of the cylinder cavity and allow hydraulic fluid flow in the second direction along the second fluid pathway between the top and bottom portions of the cylinder cavity.

In some embodiments, the shock absorber body assembly further includes a second adjustable valve disposed in line with the first fluid pathway, the second adjustable valve configured to selectively limit hydraulic fluid flow along the first fluid pathway between the top and bottom portions of the cylinder cavity.

In some embodiments, each of the first and second fluid pathways are disposed between the cylinder cavity and the reservoir cavity and in some embodiments, the first and second fluid pathways are disposed on opposite sides of the shock body.

In some embodiments, the body cap includes an attachment member configured to operably attach the shock body to a vehicle.

Also disclosed herein is shock absorber that, according to some embodiments, includes a shock body, where the shock body includes (i) a cylinder cavity defining a top cylinder end and bottom cylinder end, where the cylinder cavity is filled with a hydraulic fluid; (ii) a reservoir cavity defining a top reservoir end and bottom reservoir end, where the reservoir cavity is in fluid communication with the cylinder cavity, and the reservoir is partially filled with the hydraulic fluid and partially filled with a pressurized gas; (iii) a body cap defining a top closure of the cylinder cavity and reservoir cavity, where the body cap includes a first attachment member configured to operably couple the shock absorber to a vehicle. The shock body further includes (i) a first fluid pathway extending along an exterior of the cylinder cavity, where a first end of the first fluid pathway is in fluid communication with a top portion of the cylinder cavity and a second end of the first fluid pathway is in fluid communication with a bottom portion of the cylinder cavity; and (ii) a second fluid pathway extending along an exterior of the cylinder cavity, where a first end of the second fluid pathway first end is in fluid communication with a top portion of the cylinder cavity and second end of the second fluid pathway is in fluid communication with a bottom portion of the cylinder cavity. The shock body includes only a single component. A piston disposed within the cylinder cavity includes shaft extending through a cylinder cap that provides closure at the bottom end of the cylinder cavity, and the shaft includes a second attachment member configured to operably attach the shock absorber to a vehicle. A reservoir cap closes off the reservoir bottom end.

In some embodiments, the shock body is formed of a single material via a material additive manufacturing process.

In some embodiments, the cylinder cavity is fluidly coupled with the reservoir cavity via a transfer port extending across a common separation wall between the cylinder cavity and reservoir cavity.

In some embodiments, the first fluid pathway is separated from the cylinder cavity by a single separation wall. The first fluid pathway is fluidly coupled with the top portion of the cylinder cavity via a top port of the first fluid pathway extending across the single separation wall, and the first fluid pathway is fluidly coupled with the bottom portion of the cylinder cavity via a bottom port of the first fluid pathway extending across the single separation wall. Similarly, the second fluid pathway is separated from the cylinder cavity by a single separation wall. The second fluid pathway is fluidly coupled with the top portion of the cylinder cavity via a top port of the second fluid pathway extending across the single separation wall, and the second fluid pathway is fluidly coupled with the bottom portion of the cylinder cavity via a bottom port of the second fluid pathway extending across the single separation wall.

In some embodiments, the shock absorber further includes a first check valve disposed in line with the first fluid pathway, where the first check valve is configured to allow hydraulic fluid flow along the first fluid pathway in a first direction between the top and bottom portions of the cylinder cavity and prevent hydraulic fluid flow in a second direction along the first fluid pathway between the top and bottom portions of the cylinder cavity, where the second direction is opposite the first direction.

In some embodiments, the shock absorber further includes a first adjustable valve disposed in line with the second fluid pathway, where the first adjustable valve configured to selectively limit hydraulic fluid flow along the second fluid pathway between the top and bottom portions of the cylinder cavity.

In some embodiments, the shock absorber further includes a second check valve disposed in line with the second fluid pathway, where the second check valve configured to prevent hydraulic fluid flow along the second fluid pathway in the first direction between the top and bottom portions of the cylinder cavity and allow hydraulic fluid flow along the second fluid pathway in the second direction between the top and bottom portions of the cylinder cavity.

In some embodiments, the shock absorber further includes a second adjustable valve disposed in line with the first fluid pathway, where the second adjustable valve is configured to selectively limit hydraulic fluid flow along the first fluid pathway between the top and bottom portions of the cylinder cavity.

These and other features of the concepts provided herein will become more apparent to those of skill in the art in view of the accompanying drawings and following description, which describe particular embodiments of such concepts in greater detail.

BRIEF DESCRIPTION OF THE DRAWINGS

Embodiments of the disclosure are illustrated by way of example and not by way of limitation in the figures of the accompanying drawings, in which like references indicate similar elements and in which:

FIG. 2A is a front view of the shock body assembly of FIG. 1, in accordance with some embodiments.

FIG. 2B is a back side view of the shock body assembly of FIG. 1, in accordance with some embodiments.

DETAILED DESCRIPTION

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "top," "bottom," "front," "back," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise.

The phrases "connected to," "coupled with," and "in communication with" refer to any form of interaction between two or more entities, including but not limited to mechanical, magnetic, fluid, and thermal interaction. Two components may be coupled to each other even though they are not in direct contact with each other. For example, two components may be coupled with each other through an intermediate component. Furthermore, two components that are described as connected to or coupled with each other does not imply that the two components at one time were not connected to or coupled with each other.

References to approximations may be made throughout this specification, such as by use of the term "substantially." For each such reference, it is to be understood that, in some embodiments, the value, feature, or characteristic may be specified without approximation. For example, where qualifiers such as "about" and "substantially" are used, these terms include within their scope the qualified words in the absence of their qualifiers. For example, where the term "substantially straight" is recited with respect to a feature, it is understood that in further embodiments, the feature can have a precisely straight configuration.

Unless defined otherwise, all technical and scientific terms used herein have the same meaning as commonly understood by those of ordinary skill in the art.

Figure 1:
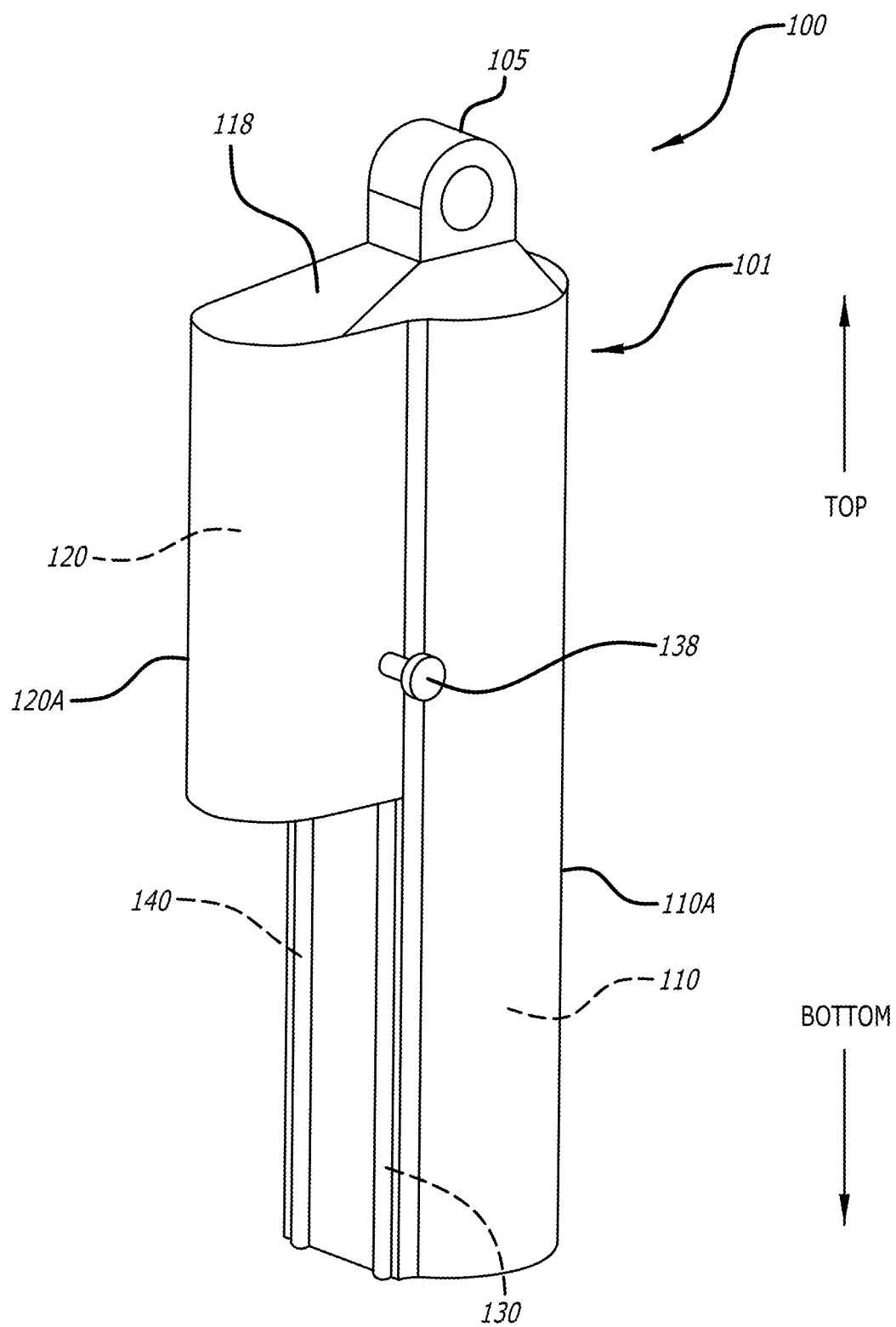
FIG. 1 is a perspective view of a shock body assembly, in accordance with some embodiments.

Referring now to FIG. 1, the drawing illustrates a perspective view of a shock body assembly that is generally configured to be combined with other components to form a shock absorber configured for damping motion of a piece of equipment having mass, such as a vehicle, for example. The shock body assembly 100 includes a shock body 101 having a number of functional components incorporated therein to complete the shock body assembly 100.

The shock body 101 generally defines a structural framework for the shock absorber. The shock body 101 is formed a single piece of material, i.e., the shock body 101 does not include the assembly multiple components. The shock body 101 is formed of a single material throughout the entirety of the shock body 101, where the material may be a compound of more than one raw material. The shock body 101 is formed a material additive manufacturing process, sometimes referred to as 3D printing. The material additive manufacturing process provides for the creation of features or shapes (e.g., under cuts) of the shock body 101 that are generally may be creatable via other conventional manufacturing process, such as machining, extruding, and the like. As such, conventional shock bodies generally include an assembly of multiple components. In some embodiments, the shock body 101 may be formed a single continuous material additive manufacturing process. For description purposes, the shock body 101 is described as a combination of shock body components coupled together, where when referring to components of the shock body 101, "coupled together" or "coupled with each other" means integrally formed together via the material additive manufacturing process.

In some embodiments, materials used may include steel, steel alloy, aluminum, and/or aluminum alloy. In other embodiments, other materials such as non-metallic materials such as polylactic acid (PLA), reinforced nylon, or polyetheretherketone (PEEK). In some embodiments, the printing process utilized may be powder bed fusion printing, e.g., Direct Metal Laser Sintering (DMLS). Various DMLS printing machines may be utilized including machines having a single 200 w laser or machines having a plurality of lasers such as machines with 8 to 12 lasers ranging from 800-1200 w per laser. Other embodiments may utilize metal binder jet printing or Direct Energy Deposition.

The shock body 101 generally includes a cylinder cavity 110 formed by a cylinder wall 110A and a reservoir cavity 120 formed by a reservoir wall 120A. During use, the cylinder cavity 110 and the reservoir cavity 120 contain hydraulic fluid. Although not required, one or both of the cylinder cavity 110 and the reservoir cavity 120 may be cylindrically shaped. In the illustrated embodiment, the cylinder cavity 110 and reservoir cavity 120 are oriented parallel with each other. In other embodiments, the cylinder cavity 110 and reservoir cavity 120 may oriented relative to each other in a non-parallel relationship. The cylinder cavity 110 and reservoir cavity 120 are closed at the top via a body cap 118. In the illustrated embodiment, the body cap 118 includes an attachment member 105 coupled therewith. In other embodiments, the attachment member 105 may be coupled with another component of the shock body 101, such as the cylinder wall 110A or the reservoir wall 120A, for example. Each of the cylinder cavity 110 and the reservoir cavity 120 are open at the bottom.

The shock body 101 further includes a first fluid pathway 130 and a second fluid pathway 140 extending along an exterior the cylinder cavity 110, where each of the first and second fluid pathways 130, 140 are described in more detail below. The shock body assembly may include one or more valves, such as the first adjustable valve 138 which is also described in further detail below.

With reference to FIGS. 2A and 2B, the drawings illustrate a front view and back view of the shock body assembly 100, respectively, showing further detail of the shock body assembly 100. The cylinder cavity 110 extends between a cylinder top end 211 and a cylinder bottom end 212, where the cylinder cavity 110 is open at the cylinder bottom end 212, and where the cylinder bottom end 212 is configured to receive a cap (see FIG. 3) to provide closure of the cylinder bottom end 212. The cylinder cavity 110 further defines a top portion 213 and a bottom portion 214. Similarly, the reservoir cavity 120 extends between a reservoir top end 221 and a reservoir bottom end 222, where the reservoir cavity is open at the reservoir bottom end 222, and where the reservoir bottom end 222 is configured to receive a cap (see FIG. 3) to provide closure of the reservoir bottom end 222.

The cylinder cavity 110 is separated from the reservoir cavity 120 via a single separation wall 216, where the separation wall 216 forms a portion of the cylinder wall 110A and the reservoir wall 120A. A transfer port 223 extending across the separation wall 216 defines a fluid coupling between the cylinder cavity 110 and the reservoir cavity 120. During use, hydraulic fluid flows back and forth between the cylinder cavity 110 and reservoir cavity 120 via the transfer port 223. In some embodiments, the transfer port 223 may be located adjacent the cylinder top end 211 and the reservoir top end 221, which location may enhance priming air bubbles from the hydraulic fluid.

The first fluid pathway 130 extends along the cylinder cavity 110. In some embodiments, the first fluid pathway 130 may extend between the cylinder top end 211 and the cylinder bottom 212. In other embodiments, the first fluid pathway 130 may extend only partially between the cylinder top end 211 and the cylinder bottom end 212, i.e., the first fluid pathway 130 may be shorter in length than the cylinder cavity 110. The first fluid pathway 130 is generally configured to provide a fluid pathway between the top portion 213 and the bottom portion 214 of the cylinder cavity 110. As such, a top end of the first fluid pathway 130 is in fluid communication with the top portion 213 of the cylinder cavity 110 and a bottom end of the first fluid pathway 130 is in fluid communication with the bottom portion 214 of the cylinder cavity 110.

The shock body assembly 100 includes the first adjustable valve 138, where the first adjustable valve 138 is disposed in line with the first fluid pathway 130. The first adjustable valve 138 is selectively adjustable by a user to define an adjustable restriction to a flow of hydraulic fluid along the first fluid pathway 130 between the top portion 213 and the bottom portion 214 of the cylinder cavity 110. In some embodiments, the first adjustable valve 138 may be omitted. As an alternative to the first adjustable valve 138, the first fluid pathway 130 may include a flow restricting orifice (not shown) to provide a non-adjustable restriction to the flow of hydraulic fluid along the first fluid pathway 130.

In some embodiments, the shock body assembly 100 may include a check valve disposed in line with the first fluid pathway 130, referred to herein as the second check valve 237. The second check valve 237 is configured to (i) allow fluid flow along the first fluid pathway 130 in a first direction, such as an upward direction from the bottom portion 214 to the top portion 213 of the cylinder cavity 110, for example, and (ii) prevent fluid flow along the first fluid pathway 130 in a second direction, where the second direction is opposite the first direction. In some embodiments, the first check valve 237 may be omitted.

Prior to the invention of this disclosure, a check valve was required to be manufactured in multiple parts and then assembled into a housing or pluming tube. As should be understood, the current methodology of manufacturing and assembling a check valve within a housing or pluming tube includes inefficiencies in time and materials as the multiple parts include material not utilized in the additive manufacturing process described herein (including wasted material and energy). The current methodology of manufacturing and assembling a check valve also introduces the possibility of error in assembly and/or manufacture (e.g., the parts may not be manufactured within a prescribed tolerance of the necessary measurements such that the parts to not fit together as desired).

One example of the type of check valve designed for the shock body of the disclosure is one where a ball is printed in free floating space that allows fluid to pass by when the fluid is flowing in a specific direction. Then when the direction of the fluid flow is reversed, due to change in direction of shock dampening piston, the ball is pushed by the fluid into a chamfered hole which checks the fluid from completing the fluid circuit. Other additively manufactured check valves may be utilized in some instances. In accordance with embodiments of the disclosure, the shock body and integrated check valve are designed so there is no need for any inaccessible supports or areas that require an acid bath in order to dissolve any low density supports to make the check valve functional. Such is another example of how the disclosure improves the efficiency of the manufacturing process of a shock body including a check valve.

One of the challenges of making a check valve is ensuring no leaks when the flow is checked. Referring to the current methodology of manufacturing and assembling a check valve, very high surface finishes are needed as well as seals or else leaks will occur. However, the methodology of the disclosure does not require the same tolerance with respect to seals. In the event that a leak occurs following printing of the check valve in accordance with embodiments of the disclosure, stopping the leak may be performed through fine tuning of the valving of the shock dampener (which is not possible with shock dampeners manufactured and assembled using current techniques). This is advantageous as the machining/assembly complexity is reduced, which reduces overall cost and wasted material, and reduces the possibility of unfixable errors.

Referring to FIG. 2B, similar to the first fluid pathway 130, the second fluid pathway 140 extends along the cylinder cavity 110. In some embodiments, the second fluid pathway 140 may extend between the cylinder top end 211 and the cylinder bottom 212. In other embodiments, the second fluid pathway 140 may extend only partially between the cylinder top end 211 and the cylinder bottom 212, i.e., the second fluid pathway 140 may be shorter in length than the cylinder cavity 110. The second fluid pathway 140 is generally configured to provide a fluid pathway between the top portion 213 and the bottom portion 214 of the cylinder cavity 110. As such, a top end of the second fluid pathway 140 is in fluid communication with the top portion 213 of the cylinder cavity 110 and a bottom end of the second fluid pathway 140 is in fluid communication with the bottom portion 214 of the cylinder cavity 110.

In some embodiments, the shock body assembly 100 may include second adjustable valve 248, where the second adjustable valve 248 is disposed in line with the second fluid pathway 140. The second adjustable valve 248 is selectively adjustable by the user to define an adjustable restriction to a flow of hydraulic fluid along the second fluid pathway 140 between the top portion 213 and the bottom portion 214 of the cylinder cavity 110. In some embodiments, the second adjustable valve 248 may be omitted. As an alternative to the second adjustable valve 248, the second fluid pathway 140 may include a flow restricting orifice (not shown) to provide a non-adjustable restriction to the flow of hydraulic fluid along the second fluid pathway 140.

In some embodiments, the shock body assembly 100 may include a check valve disposed in line with the second fluid pathway 140, referred to herein as the first check valve 237. The first check 237 is configured to (i) allow fluid flow along the second fluid pathway 140 in the section direction, such as a downward direction from the top portion 213 to the bottom portion 214 of the cylinder cavity 110, for example, and (ii) prevent fluid flow along the second fluid pathway 140 in the first direction. Said differently, the first and second check valves 237, 247 are oriented in opposite directions with respect to the top portion 213 and the bottom portion 214 of the cylinder cavity 110.

By way of summary, each of the fluid pathways 130, 140 may be configured to restrict the flow of hydraulic fluid there along and/or prevent the flow of hydraulic fluid in one direction. In some embodiments, the shock body assembly 100 may include only the first check valve 247. In some embodiments, the shock body assembly 100 may include only the first check valve 247 and the first adjustable valve 138. In some embodiments, the shock body assembly 100 may include only the first check valve 247, the first adjustable valve 138, and the second adjustable valve 248. In some embodiments, the shock body assembly 100 may include the first check valve 247, the first adjustable valve 138, the second adjustable valve 248, and the second check valve 237.

Figure 2C:
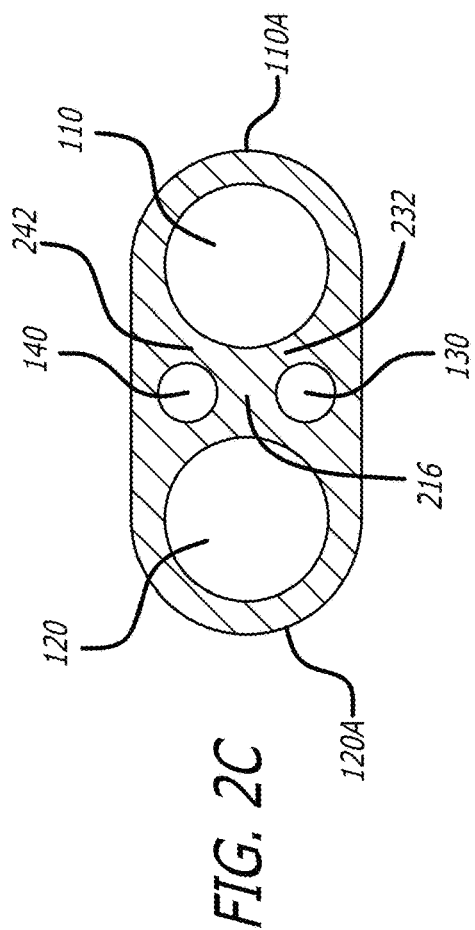
FIGS. 2C-2F are cross-sectional illustrations of the shock body of the assembly of FIG. 1, in accordance with some embodiments.

Referring now to FIGS. 2C-2F, the drawings illustrate cross-sections of the shock body 101 as indicated by sectioning lines in FIG. 2A. FIG. 2C illustrates a cross-section as cut long the sectioning line C-C of FIG. 2A, where first fluid pathway 130 extends along a top portion 213 of the cylinder cavity 110. In some embodiments, as shown, the first fluid pathway 130 and the second fluid pathway 140 may be disposed between the cylinder cavity 110 and reservoir cavity 120. In some embodiments, the first fluid pathway 130 and the second fluid pathway 140 may be disposed on opposite sides of the shock body 101. The first fluid pathway 130 is separated from the cylinder cavity 100 by a first single separation wall 232. Similarly, the second fluid pathway 130 is separated from the cylinder cavity 100 by a second single separation wall 242.

Figure 2D:
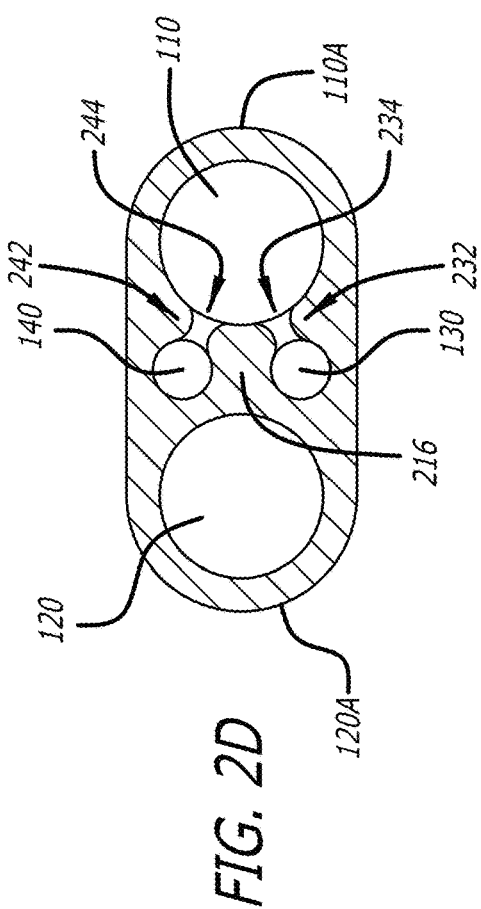

FIG. 2D illustrates a cross-section as cut long the sectioning line D-D of FIG. 2A, where the sectioning line D-D is positioned at the location where the top end of the first fluid pathway 130 is fluidly coupled with the top portion 213 of the cylinder cavity 110, which, in some embodiments, may be the same location where the top end of the second fluid pathway 140 is fluidly coupled with the top portion 213 of the cylinder cavity 110. As shown, an upper port 234 of the first fluid pathway 130 extends across the first single separation wall 232 to fluidly couple the top end of the first fluid pathway 130 with the top portion 213 of the cylinder cavity 110. As further shown, an upper port 244 of the second fluid pathway 140 extends across the second single separation wall 242 to fluidly couple the top end of the second fluid pathway 140 with the top portion 213 of the cylinder cavity 110.

Figure 2E:
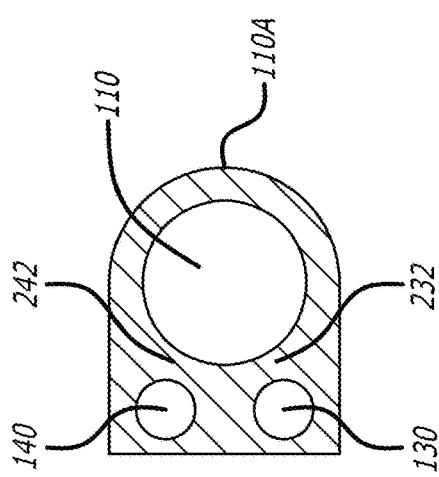

FIG. 2E illustrates a cross-section as cut long the sectioning line E-E of FIG. 2A, where first fluid pathway 130 extends along the bottom portion 214 of the cylinder cavity 110. The first fluid pathway 130 remains separated from the cylinder cavity 100 by the first single separation wall 232 and the second fluid pathway 130 remains separated from the cylinder cavity 100 by the second single separation wall 242.

Figure 2F:
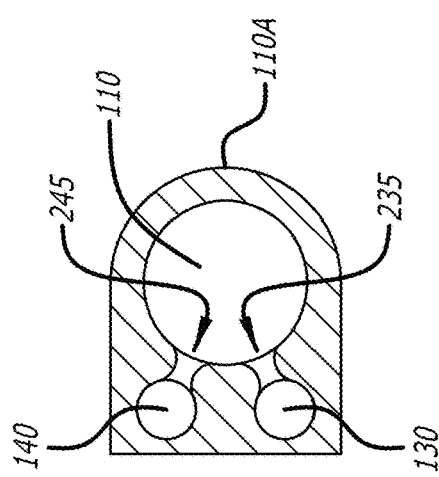

FIG. 2F illustrates a cross-section as cut long the sectioning line F-F of FIG. 2A, where the sectioning line F-F is positioned at the location where the bottom end of the first fluid pathway 130 is fluidly coupled with the bottom portion 214 of the cylinder cavity 110, which, in some embodiments, may be the same location where the second fluid pathway 140 is fluidly coupled with the bottom portion 214 of the cylinder cavity 110. As shown, a lower port 235 of the first fluid pathway 130 extends across the first single separation wall 232 to fluidly couple the bottom end of the first fluid pathway 130 with the bottom portion 214 of the cylinder cavity 110. As further shown, a lower port 244 of the second fluid pathway 140 extends across the second single separation wall 242 to fluidly couple the bottom end of the second fluid pathway 140 with the bottom portion 214 of the cylinder cavity 110.

Figure 3:
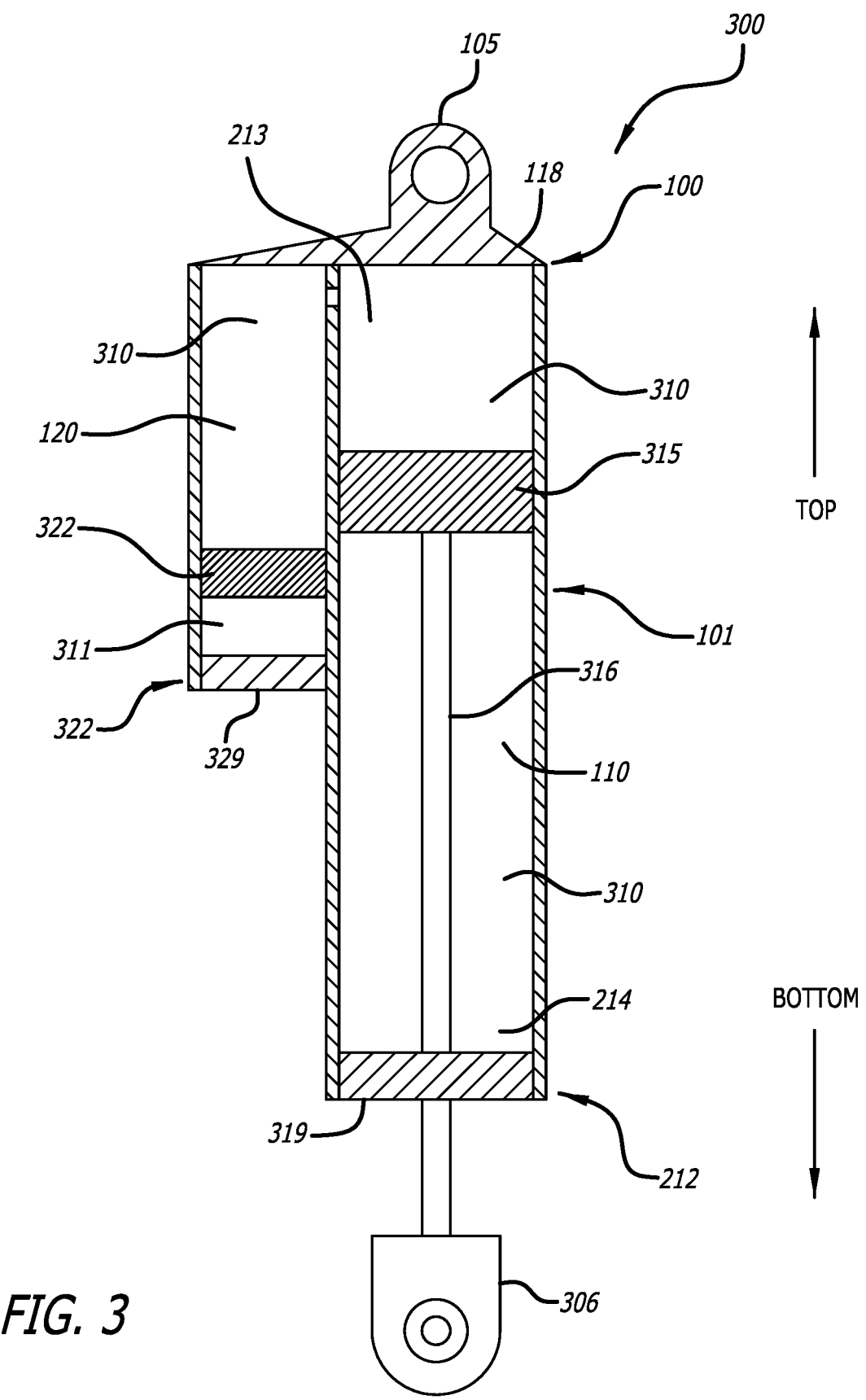
FIG. 3 illustrates an exemplary embodiment of a shock absorber that includes the shock body assembly of FIG. 1, in accordance with some embodiments.

Referring to FIG. 3, the drawing illustrates an exemplary shock absorber 300 that includes the shock body assembly 100. The shock absorber 300 includes a piston 315 coupled with a shaft 316. A cylinder cap 319 sealably closes off the bottom end 212 of the cylinder cavity 110 and the shaft 316 slidably passes through the cylinder cap 319. The shaft 316 includes a second attachment member 306 that combined with the attachment member 105 is configured to attach the shock absorber 300 to a vehicle or other piece of equipment. During use, the piston 315 travels up and down within the cylinder cavity 110. The cylinder cavity 110, including the top portion 113 and the bottom portion 214, are filled with hydraulic fluid 310. The reservoir cavity 120 is partially filled with the hydraulic fluid 310 and partially filled with a gas 311 (e.g., pressurized nitrogen). The hydraulic fluid 310 is separated from the gas 311 via a separating member 322 (e.g., a floating piston or a bladder). A reservoir cap 329 closes off the reservoir bottom end 222.

Figure 4:
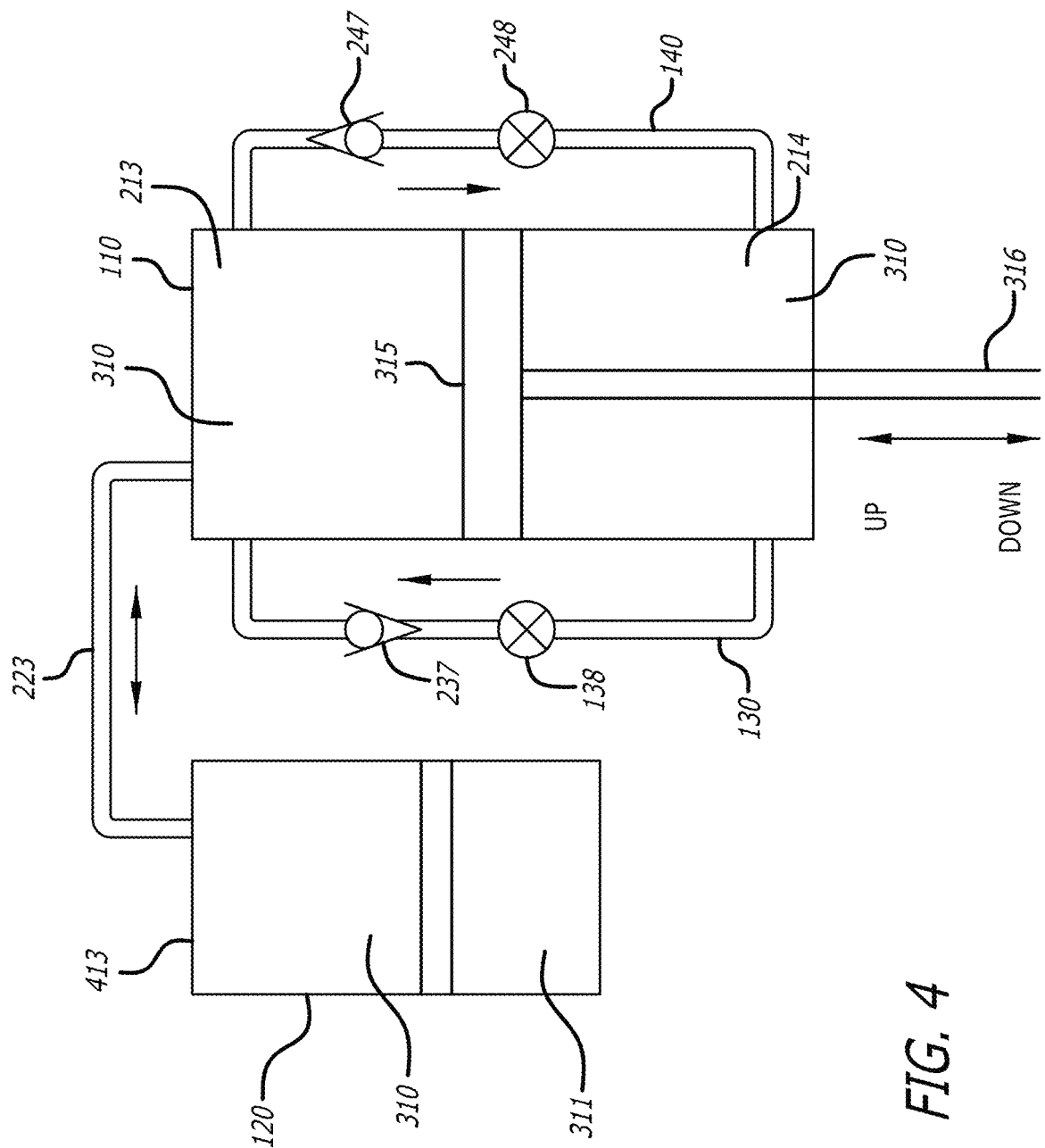
FIG. 4 is a fluid schematic illustration of the shock absorber of FIG. 3, in accordance with some embodiments.

With to FIG. 4, the drawing illustrates a fluid schematic illustration of the exemplary shock absorber 300 including components of the shock body assembly 100. The first fluid pathway 130 (i) extends between the top portion 213 and the bottom portion 214 of the cylinder cavity 110 and (ii) includes the first adjustable valve 138 and the second check valve 237 disposed in line therewith. Similarly, the second fluid pathway 140 (i) extends between the top portion 213 and the bottom portion 214 of the cylinder cavity 110 and (ii) includes the second adjustable valve 248 and the first check valve 247 disposed in line therewith. The transfer port 223 extends between a top portion 413 of the reservoir cavity 120 and the top portion 213.

During operation, the piston 315 travels up and down within the cylinder cavity 110. As the piston travels upward, the hydraulic fluid 310 flows along the second fluid pathway 140 from the top portion 213 to the bottom portion 214 of the cylinder cavity 110. The second adjustable valve 248 provides a restriction to the flow of the hydraulic fluid 310 along the second fluid pathway 140 to provide damping to the upward motion of the piston 315 (i.e., compression damping). The second check valve 237 prevents the hydraulic fluid 310 from flowing along the first fluid pathway 130 when the piston 315 travels upward. The user may adjust the second adjustable valve 248 to adjust the compression damping coefficient or amount.

As the piston travels downward, the hydraulic fluid 310 flows along the first fluid pathway 130 from the bottom portion 214 to the top portion 213. The first adjustable valve 138 provides a restriction to the flow of the hydraulic fluid 310 along the first fluid pathway 130 to provide damping to the downward motion of piston 315 (i.e., extension damping). The first check valve 247 prevents the hydraulic fluid 310 from flowing along the second fluid pathway 130 when the piston 315 travels downward. The user may adjust the first adjustable valve 138 to adjust the extension damping coefficient or amount.

In addition to the claims presented below, additional inventive concepts include a shock absorber further comprising a first check valve disposed in line with the first fluid pathway, the first check valve configured to allow hydraulic fluid flow in a first direction between the top and bottom portions of the cylinder cavity and prevent hydraulic fluid flow in a second direction between the top and bottom portions of the cylinder cavity, the second direction opposite the first direction. The shock absorber may further comprise a first adjustable valve disposed in line with the second fluid pathway, the first adjustable valve configured to selectively limit hydraulic fluid flow along the second fluid pathway between the top and bottom portions of the cylinder cavity. Still additionally, the shock absorber may further comprise a second check valve disposed in line with the second fluid pathway, the second check valve configured to prevent hydraulic fluid flow in the first direction between the top and bottom portions of the cylinder cavity and allow hydraulic fluid flow in the second direction between the top and bottom portions of the cylinder cavity. Still further, the shock absorber may further comprise a second adjustable valve disposed in line with the first fluid pathway, the second adjustable valve configured to selectively limit hydraulic fluid flow along the first fluid pathway between the top and bottom portions of the cylinder cavity.

While some particular embodiments have been disclosed herein, and while the particular embodiments have been disclosed in some detail, it is not the intention for the particular embodiments to limit the scope of the concepts provided herein. Additional adaptations and/or modifications can appear to those of ordinary skill in the art, and, in broader aspects, these adaptations and/or modifications are encompassed as well. Accordingly, departures may be made from the particular embodiments disclosed herein without departing from the scope of the concepts provided herein.

What is claimed is:

1. A shock absorber body assembly, comprising:
   a shock body, comprising:
     a cylinder cavity defining a top cylinder end and bottom cylinder end;
     a reservoir cavity defining a top reservoir end and bottom reservoir end, the reservoir cavity in fluid communication with the cylinder cavity;
     a body cap defining a top closure of the cylinder cavity and the reservoir cavity,
     a first fluid pathway extending along an exterior of the cylinder cavity defining a first end of the first fluid pathway in fluid communication with a top portion of the cylinder cavity and second end of the first fluid pathway in fluid communication with a bottom portion of the cylinder cavity, wherein the first fluid pathway is:
       separated from the cylinder cavity by a first separation wall, fluidly coupled with the top portion of the cylinder cavity via a top port of the first fluid pathway extending across the first separation wall, and fluidly coupled with the bottom portion of the cylinder cavity via a bottom port of the first fluid pathway extending across the first separation wall;

a second fluid pathway extending along an exterior of the cylinder cavity defining a first end of the second fluid pathway in fluid communication with a top portion of the cylinder cavity and second end of the second fluid pathway in fluid communication with a bottom portion of the cylinder cavity, wherein the second fluid pathway is:

separated from the cylinder cavity by a second separation wall, fluidly coupled with the top portion of the cylinder cavity via a top port of the second fluid pathway extending across the second separation wall, and fluidly coupled with the bottom portion of the cylinder cavity via a bottom port of the second fluid pathway extending across the second separation wall, and wherein the shock body is formed via a material additive manufacturing process.

2. The assembly of claim 1, further comprising a first check valve disposed in line with the first fluid pathway, the first check valve configured to allow hydraulic fluid flow in a first direction between the top and bottom portions of the cylinder cavity and prevent hydraulic fluid flow in a second direction between the top and bottom portions of the cylinder cavity, the second direction opposite the first direction.

3. The assembly of claim 2, further comprising a first adjustable valve disposed in line with the second fluid pathway, the first adjustable valve configured to adjustably limit hydraulic fluid flow along the second fluid pathway between the top and bottom portions of the cylinder cavity.

4. The assembly of claim 3, further comprising a second check valve disposed in line with the second fluid pathway, the second check valve configured to prevent hydraulic fluid flow in the first direction between the top and bottom portions of the cylinder cavity and allow hydraulic fluid flow in the second direction between the top and bottom portions of the cylinder cavity.

5. The assembly of claim 4, further comprising a second adjustable valve disposed in line with the first fluid pathway, the second adjustable valve configured to adjustably limit hydraulic fluid flow along the first fluid pathway between the top and bottom portions of the cylinder cavity.

6. The assembly of claim 3, wherein the first adjustable valve is disposed between the top and bottom ends of the reservoir cavity.

7. The assembly of claim 1, wherein the cylinder cavity and reservoir cavity share a common separation wall.

8. The assembly of claim 7, wherein the cylinder cavity is fluidly coupled with the reservoir cavity via a transfer port extending across the common separation wall.

9. The assembly of claim 8, wherein the transfer port is located adjacent the top cylinder end and the top reservoir end.

10. The assembly of claim 1, wherein each of the first and second fluid pathways are disposed between the cylinder cavity and the reservoir cavity.

11. The assembly of claim 10, wherein the first and second fluid pathways are disposed on opposite sides of the shock body.

12. The assembly of claim 1, wherein the shock body is formed of a single material.

13. The assembly of claim 1, wherein the cylinder cavity is configured to receive a cylinder cap at the bottom cylinder end, and the reservoir cavity is configured to receive a reservoir cap at the bottom reservoir end.

14. The assembly of claim 1, wherein the body cap includes an attachment member configured to operably attach the shock absorber body to a vehicle.

15. A shock absorber, comprising:

a shock body, comprising:

a cylinder cavity defining a top cylinder end and bottom cylinder end;

a reservoir cavity defining a top reservoir end and bottom reservoir end, the reservoir cavity in fluid communication with the cylinder cavity;

a body cap defining a top closure of the cylinder cavity and the reservoir cavity, a first fluid pathway extending along an exterior of the cylinder cavity defining a first end of the first fluid pathway in fluid communication with a top portion of the cylinder cavity and second end of the first fluid pathway in fluid communication with a bottom portion of the cylinder cavity, wherein the first fluid pathway is:

separated from the cylinder cavity by a first separation wall, fluidly coupled with the top portion of the cylinder cavity via a top port of the first fluid pathway extending across the first separation wall, and fluidly coupled with the bottom portion of the cylinder cavity via a bottom port of the first fluid pathway extending across the first separation wall;

a second fluid pathway extending along an exterior of the cylinder cavity defining a first end of the second fluid pathway in fluid communication with a top portion of the cylinder cavity and second end of the second fluid pathway in fluid communication with a bottom portion of the cylinder cavity, wherein the second fluid pathway is:

separated from the cylinder cavity by a second separation wall, fluidly coupled with the top portion of the cylinder cavity via a top port of the second fluid pathway extending across the second separation wall, and fluidly coupled with the bottom portion of the cylinder cavity via a bottom port of the second fluid pathway extending across the second separation wall, and wherein the shock body is formed via a material additive manufacturing process;

a piston disposed within the cylinder cavity, the piston having a shaft extending through cylinder cap providing closure at the bottom end of the cylinder cavity, the shaft including a second attachment member configured operably attach the shock absorber to the vehicle; and a reservoir cap defining closure at the reservoir bottom end.

16. The shock absorber of claim 15, wherein the cylinder cavity is fluidly coupled with the reservoir cavity via a transfer port extending across a common separation wall between the cylinder cavity and reservoir cavity.

* * * * *